(12) United States Patent
Baugh

(10) Patent No.: US 6,939,082 B1
(45) Date of Patent: Sep. 6, 2005

(54) SUBEA PIPELINE BLOCKAGE REMEDIATION METHOD

(76) Inventor: Benton F. Baugh, 14626 Oak Bend, Houston, TX (US) 77079-6441

( * ) Notice: Subject to any disclaimer, the term of this patent is extended or adjusted under 35 U.S.C. 154(b) by 0 days.

(21) Appl. No.: 09/398,276

(22) Filed: Sep. 20, 1999

(51) Int. Cl.⁷ .......................... F16L 53/00; E21B 43/24
(52) U.S. Cl. ...................... 405/154; 138/32; 219/59.1; 166/302; 166/61
(58) Field of Search ................................. 405/154, 158, 405/159; 138/27, 32–34; 219/59.1; 166/302, 166/303, 57–62

(56) References Cited

U.S. PATENT DOCUMENTS

| | | | | |
|---|---|---|---|---|
| 4,157,847 A | * | 6/1979 | Williams et al. | 166/62 X |
| 4,420,114 A | * | 12/1983 | Moser et al. | 237/1 R |
| 4,523,644 A | * | 6/1985 | Dismukes | 166/302 |
| 4,641,710 A | * | 2/1987 | Klinger | 166/266 X |
| 4,679,598 A | * | 7/1987 | Jee | 166/302 X |
| 5,182,792 A | * | 1/1993 | Goncalves | 166/60 X |
| 5,443,056 A | * | 8/1995 | Smith et al. | 126/263.05 |
| 5,470,458 A | * | 11/1995 | Ripley et al. | 137/13 |
| 5,803,161 A | * | 9/1998 | Wahle et al. | 166/302 X |
| 5,939,667 A | * | 8/1999 | Oudoire et al. | 136/205 |
| 6,035,933 A | * | 3/2000 | Khalil et al. | 166/263 |
| 6,049,657 A | * | 4/2000 | Sumner | 392/469 |
| 6,142,707 A | * | 11/2000 | Bass et al. | 405/158 |
| 6,264,401 B1 | * | 7/2001 | Langner et al. | 405/169 |

* cited by examiner

Primary Examiner—Thomas B. Will
Assistant Examiner—Tara L. Mayo

(57) ABSTRACT

The method of taking a remotely operated vehicle to the ocean floor to land on and move along a subsea pipeline above or below the seafloor and repeatedly circulate seawater which has been heated electrically, mechanically, or chemically across the outer surface of the pipeline to melt hydrates or paraffins which have formed on the inside of the pipeline.

19 Claims, 13 Drawing Sheets

SUBEA PIPELINE BLOCKAGE REMEDIATION METHOD

BACKGROUND OF THE INVENTION

The field of this invention is that of removing blockages in remote subsea pipeline, typically from subsea gas well installations.

Hydrates are a porous solid which is formed primarily of water with a mixture of gases. It is effectively similar to ice. There is a tendency for hydrates to form in the pipelines departing from a subsea gas well, especially on well startup.

The temperature of seawater at depths will often approach 32° F., with the temperature in non-flowing pipelines being the same. When a subsea pipeline valve is opened, the gas expansion can cause substantial additional cooling. In these cold and high pressure conditions, hydrates of the gas and water can quickly form.

Frequently when the hydrate forms, it forms a blockage, the blockage will be somewhat porous. At that time, a high pressure will exist on the upstream side and a lower pressure will exist on the downstream side of the blockaged. This means that additional gas will move thru the hydrate and expand and therefore cool as it does. This means that not only can the expansion of this gas keep the formed hydrate cool, but can literally continue to grow additional hydrate blockage.

It is difficult to tell where the hydrates are actually located in deepwater pipelines, especially when the pipelines are buried.

Hydrates formed like this can last for weeks or months, with a substantial loss of gas flow and therefore revenue to the owner of the pipelines and subsea wells.

Paraffins can form blockages in pipelines by building up on the inner diameter of the cold pipelines as relatively warm oil circulates out of an oil well and cools as it flows down a subsea pipeline. As the layer of paraffin builds up on the subsea pipeline inner diameter, the inner diameter of the paraffin becomes smaller and smaller. Ultimately a pigging device intended to clean the paraffin will cause the paraffin to separate from the inner wall of the pipeline and become a plug. In some cases the paraffin will release from the subsea pipeline inner diameter without a pig and cause a blockage. In either case, if the pressure in the pipeline is enough to move the plug along the pipeline, it will continue to collect additional paraffin as it moves until the length of the blockage cannot be moved by the available pressure.

Some attempts have been made to enter the end of the pipeline with a somewhat flexible string of coiled tubing to get to the blockage and wash it out. This is an expensive operation, and in some cases the blockage can be 10 to 20 miles away.

Removal by use of coiled tubings can be further complicated if the pipeline has bends in it, making passage of the coiled tubing difficult if not impossible.

SUMMARY OF THE INVENTION

The object of this invention is to provide a system which will approach a subsea pipeline and remove hydrate and/or paraffin blockages from within the pipeline.

A second object of the present invention is to provide a method of removing the hydrate or paraffin without requiring that the pressure integrity of the pipeline be compromised.

A third object of the present invention is to provide for recirculation of seawater to allow the heat not absorbed into the pipeline to increase the inlet temperature to the seawater heating means—thereby increasing the outlet temperature of the seawater.

Another object of the present invention is to provide a means for applying heat to the outer surface of a subsea pipeline without uncovering the pipeline to minimize the disturbance to the pipeline.

Another object of the present invention is to provide means for applying heat to the outer surface of a subsea pipeline without uncovering the pipeline so that the insulating effects of the covering will retain the heat in the pipeline.

DESCRIPTION OF THE PREFERRED EMBODIMENT

Figure 1:
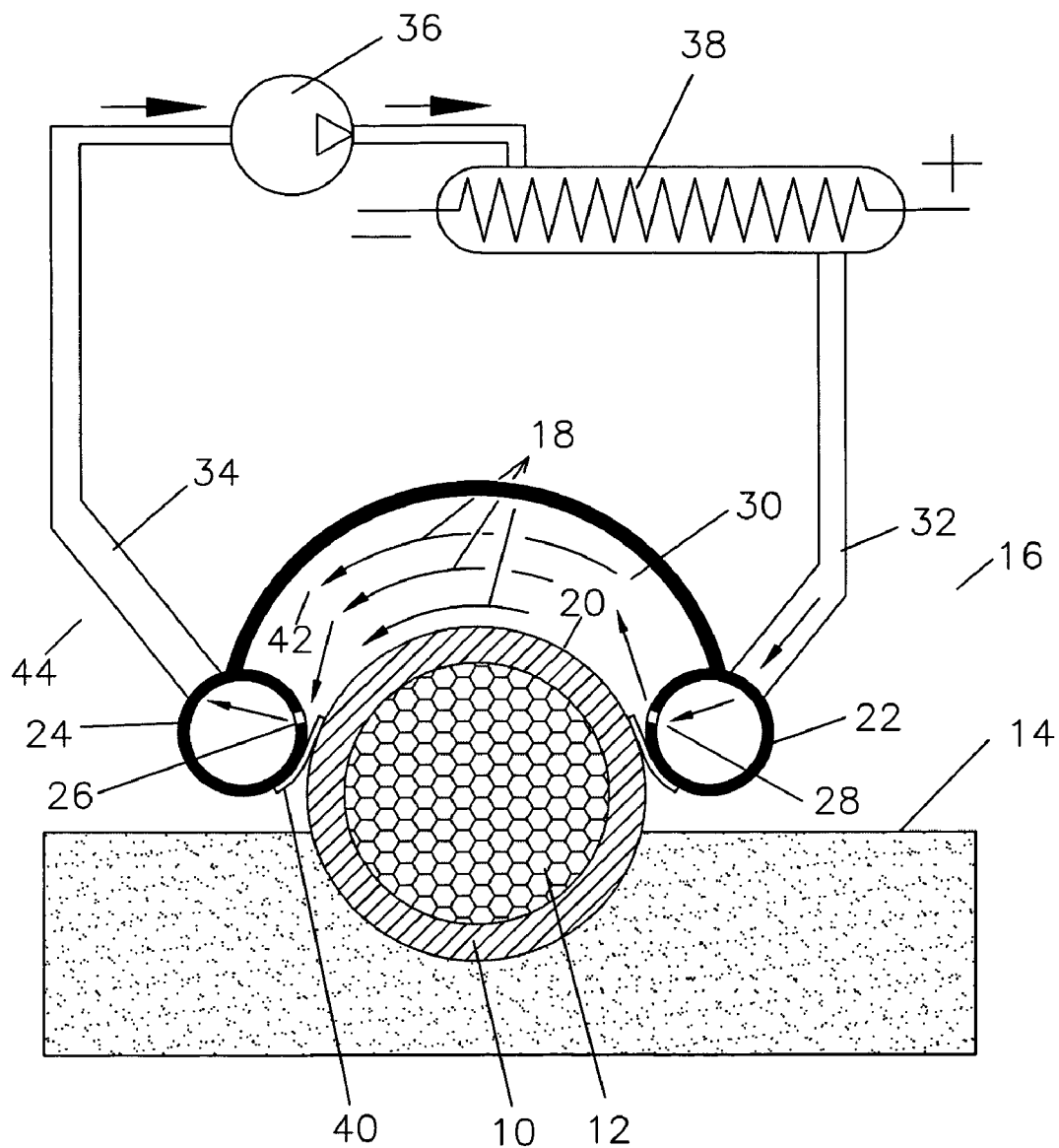
FIG. 1 is a section thru the pipeline and the thermal operating module showing the circulation thru the circulation chamber.

Referring now to FIG. 1, a subsea pipeline 10 has a blockage indicated at 12. The subsea pipeline 10 is setting on the seafloor 14 and is covered by seawater 16 which may be as cold as 32° F. Arrows 18 indicate the flowing of heated seawater across the upper portion 20 of the subsea pipeline 10 for the purpose of disassociating the pipeline blockage 12. The disassociation may be melting a hydrate, melting a paraffin blockage, or softening a paraffin blockage to the point that it will flow.

Two tubes 22 and 24 run parallel to the subsea pipeline and have a plurality of holes 26 and 28 which direct heated seawater into the circulation chamber 30 or out of the circulation chamber 30 respectively. Line 32 feeds heated seawater into tube 22 and return line 34 draws the seawater out of tube 24. The return line 34 leads to pump 36 and then to heating element 38 and back to tube 32. The heated seawater which is introduced into the combustion chamber by tube 22 is somewhat cooled by flowing across the upper portion 20 of subsea pipeline 10 before it enters tube 24 to return thru the pump and back into the heating element 38. As the returning seawater is only partially cooled, the inlet to the heating element 38 is higher, so the output seawater from the heating element will be progressively higher each circulation until a temperature is reached in which the heat losses thru the insulation will equal the heat input and so a form of steady state will be achieved.

Resilient flap type seals 40 are placed around the perimeter of the circulation chamber 30 to restrict the mixture of the seawater 42 within the circulation chamber with the seawater 44 outside the circulation chamber.

Most conventional ROVs have a minimum of 100 horsepower of electricity which can almost all be converted into heat thru a resistance heater, so it can be readily seen that if the same seawater is circulated with only minimal leakage, it can be quickly brought to a high temperature.

Figure 2:
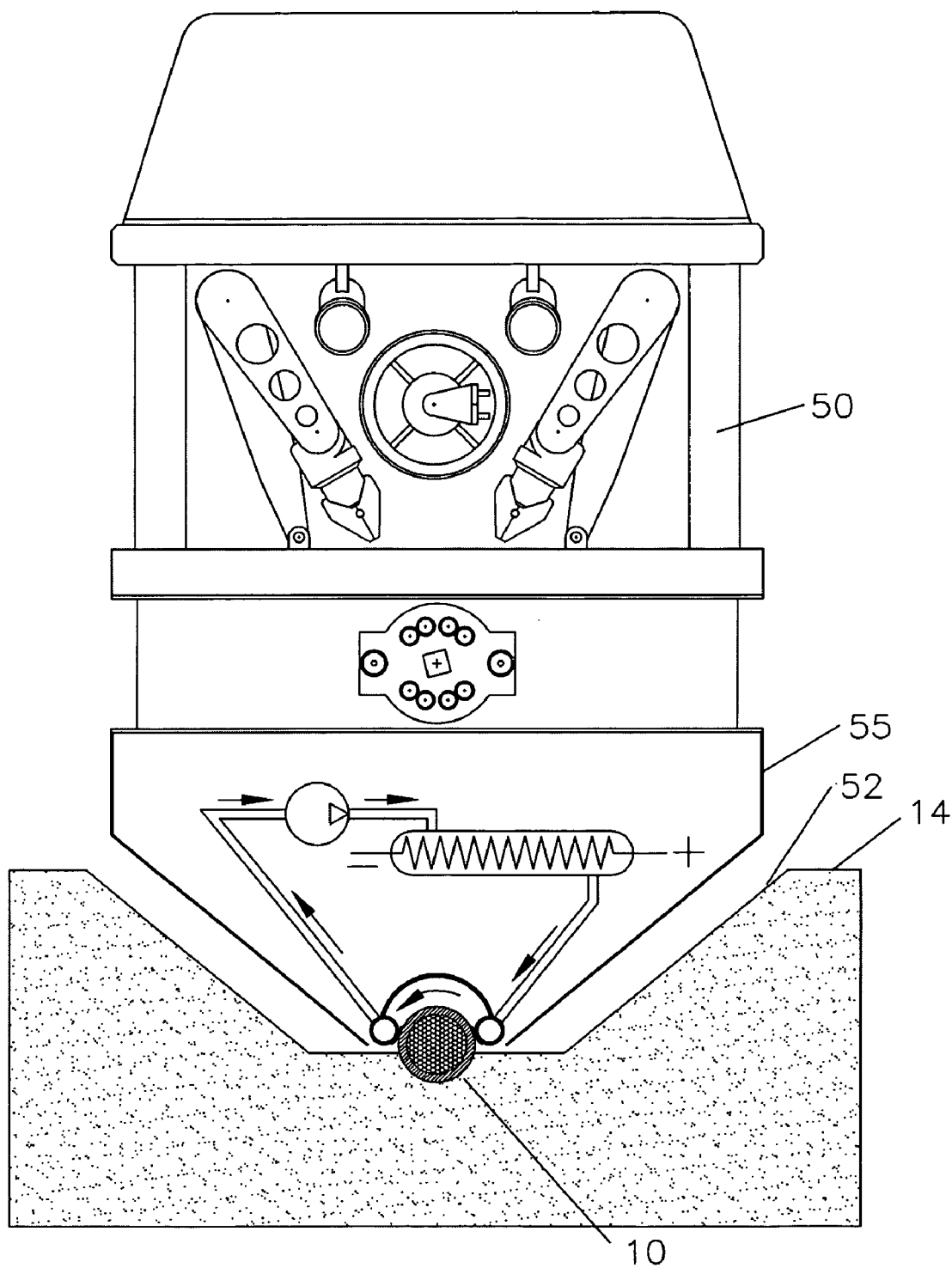
FIG. 2 is a larger section of the view of FIG. 1 including a trench dug to uncover the pipeline and the remotely operated vehicle (ROV).

Referring now to FIG. 2, the apparatus of FIG. 1 is shown below an ROV 50 and operating in an area of the subsea pipeline 10 which has been uncovered in a ditch form 52. By uncovering only the top portion of the pipeline, the lower portion of the seafloor is left intact to support the pipeline. The thermal operating module is generally referred to as 55.

Figure 3:
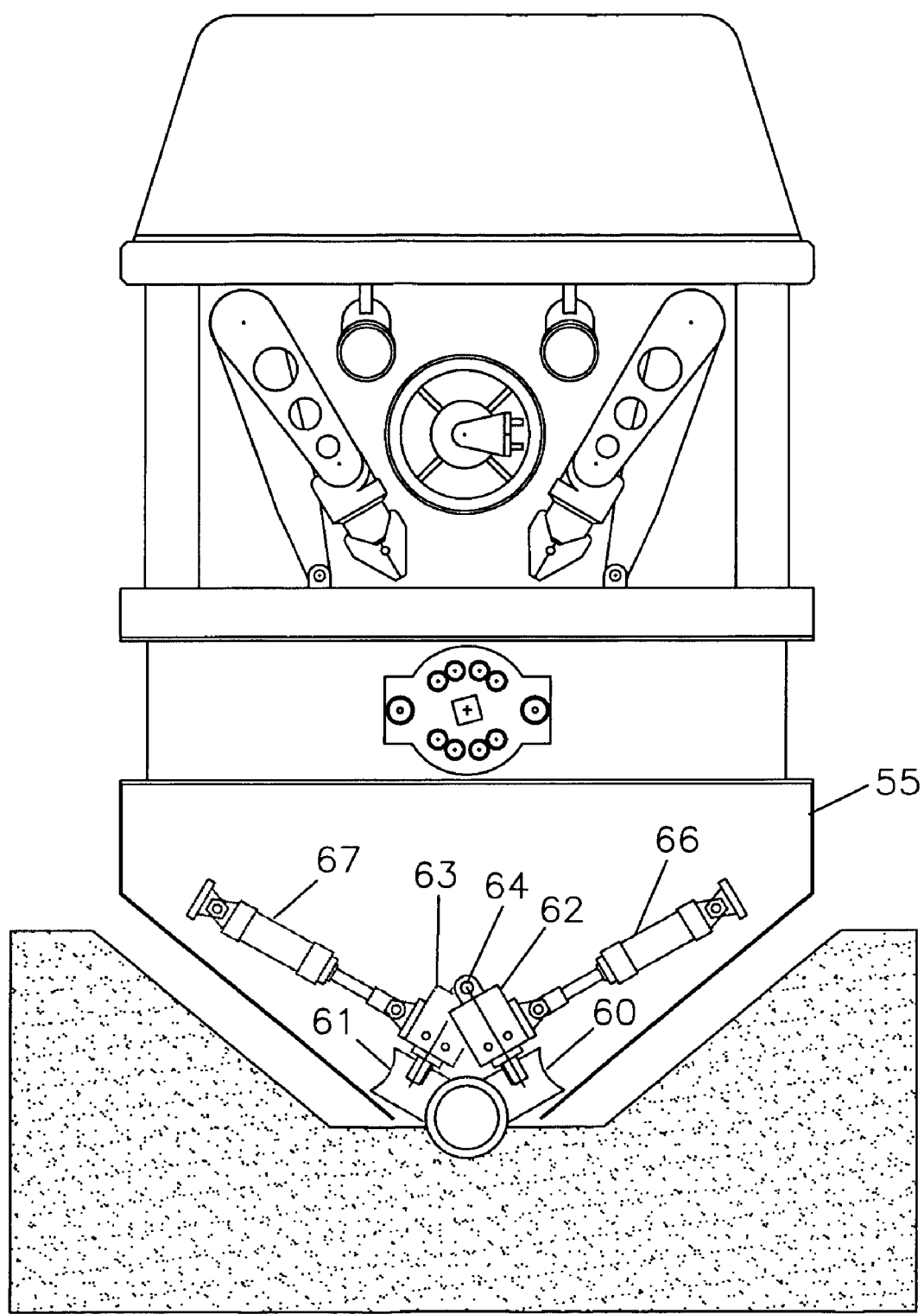
FIG. 3 is a similar section thru the system, but showing wheels which might engage the exterior of the pipeline to drive the thermal operating module along the pipeline.

Referring now to FIG. 3, an alternate section through the thermal operating module 55 showing rollers 60 and 61 mounted on motors 62 and 63 and pivoted about pin 64. Cylinders 66 and 67 will move to push the rollers 60 and 61 against the pipeline 10 and the motors 62 and 63 will turn the rollers 60 and 61 to drive the thermal operating module along the pipeline.

Figure 4:
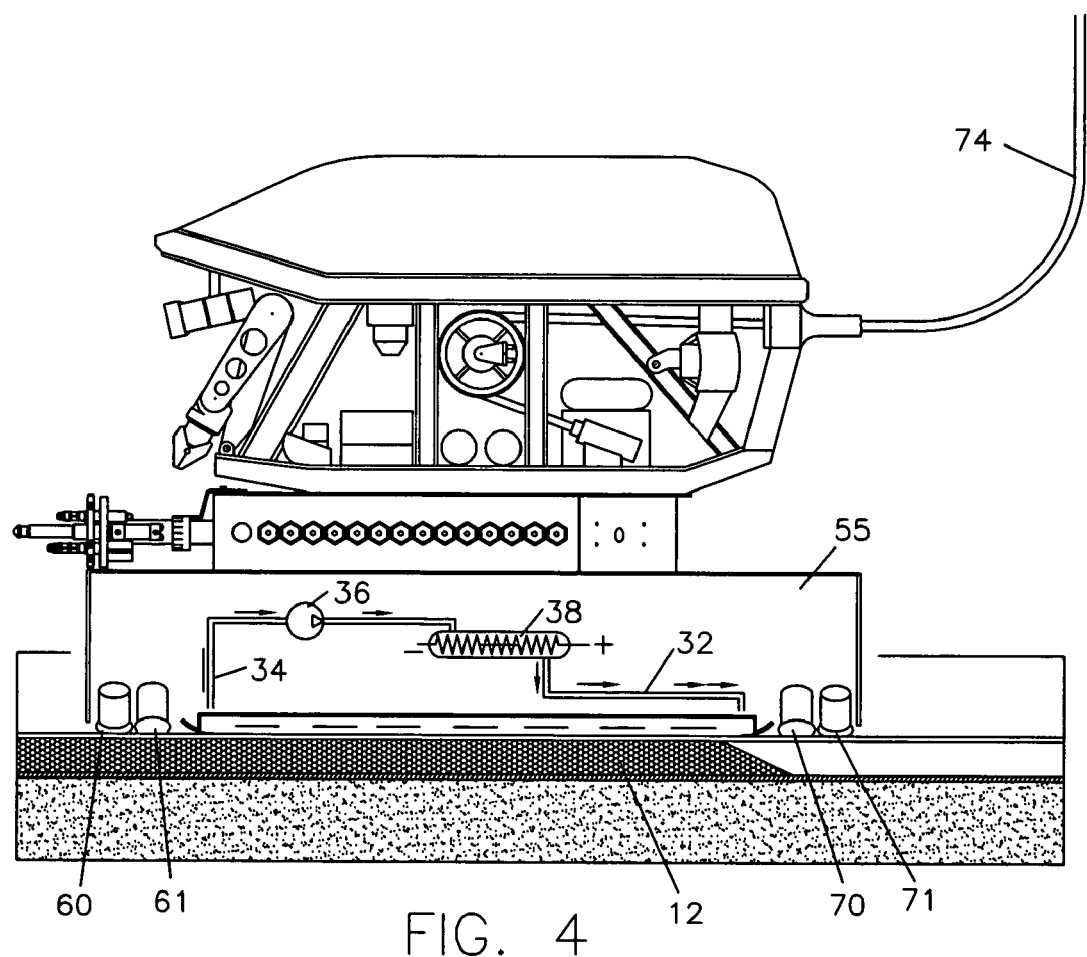
FIG. 4 is a partial section of the system taken axially along the pipeline showing a spatial relationship between the driving wheels and a heating chamber utilizing electric resistance heating of the seawater used for the heating.

Referring now to FIG. 4, rollers 60, 61, 70, and 71 are shown positioned to move the thermal operating module 55 along the pipeline 10. The speed along the pipeline would be calculated to allow the hydrates and/or paraffin in the pipeline to melt during the heating cycle. Umbilical 74 typically provides 100 to 150 horsepower of electricity to operate the ROV, but in the case of the thermal operating module will use a majority of this electrical horsepower to generate heat.

Figure 5:
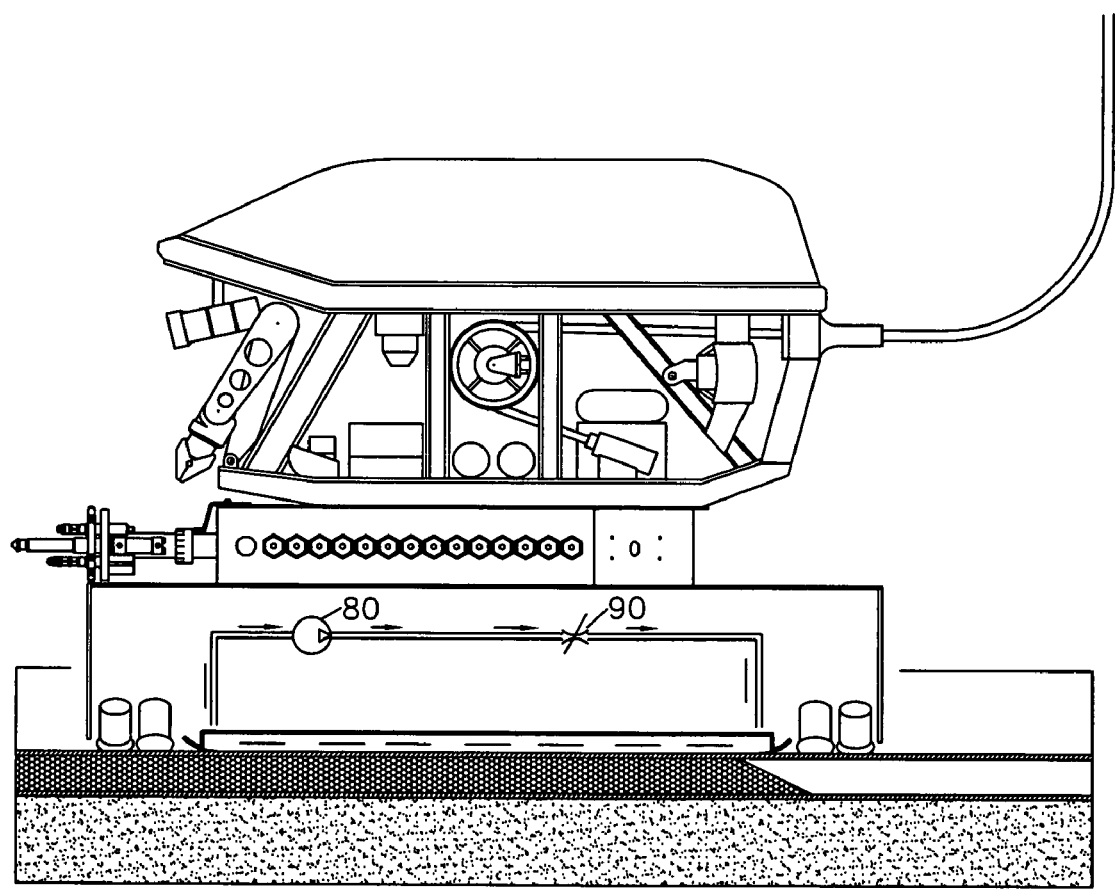
FIG. 5 is a similar figure to FIG. 4, but showing the heat being generated by a pressure drop across an orifice rather than electric resistance heating.

Referring now to FIG. 5, an alternate method of converting energy into heat is illustrated. Rather than providing electrical resistance heating, the energy is directed toward the pump 80 which is a high pressure pump (i.e. 10,000 p.s.i.) rather than a circulating pump like 36 (i.e. 15 p.s.i.). The high pressure output of pump 80 is directed across a pressure reducing means such as an orifice 90 to drop the pressure to a low pressure (i.e. 15 p.s.i.). In dropping the pressure in this "inefficient" manner, the horsepower required to operated the pump is lost into heat, which is our goal. In some situations it may be convenient to run a hose or pipe from the surface to simply provide high pressure fluid for heat generation at the subsea location in a similar manner. Using pressure to transport energy to a subsea location is practical, whereas attempting to directly pump high temperature fluid to a subsea location will result in substantial thermal energy losses.

Alternate methods of generating heat at the subsea location adjacent to the pipeline such as chemical reactions can also be used to provide the heat necessary for the task of pipeline blockage remediation.

Figure 6:
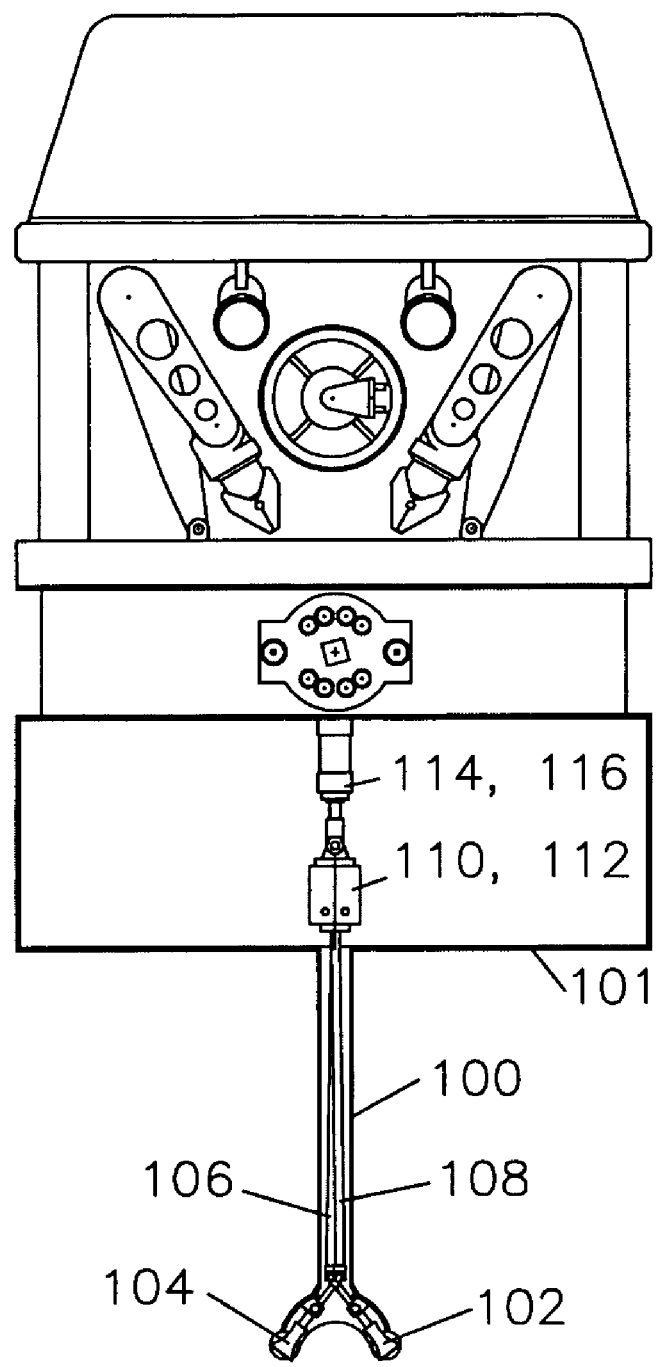
FIG. 6. shows an alternate embodiment of this invention with the circulation chamber being disposed a distance away from the main portion of the system to allow the circulation chamber to follow the pipeline under the mudline without uncovering the pipeline.

Referring now to FIG. 6, an embodiment is illustrated which can eliminate the requirement for uncovering and then recovering the subsea pipelines. Both uncovering and recovering subsea pipelines are expensive tasks. It is inherently true if the sea bottom is soft enough for the pipeline to be buried into it, it is relatively soft. FIG. 6 illustrates the circulation chamber 30 being streamlined and mounted on streamlined legs such that they will simply plow through the soft seafloor bottom. Leg 100 extends down from the heat generation section 101 and supports the circulation chamber 30 and a pair of rollers 102 and 104. Operation of the rollers will be discussed in the next figure. Drive shafts 106 and 108 go up to motors 110 and 112 (not seen) which are mounted on cylinders 114 and 116 (not seen).

Figure 7:
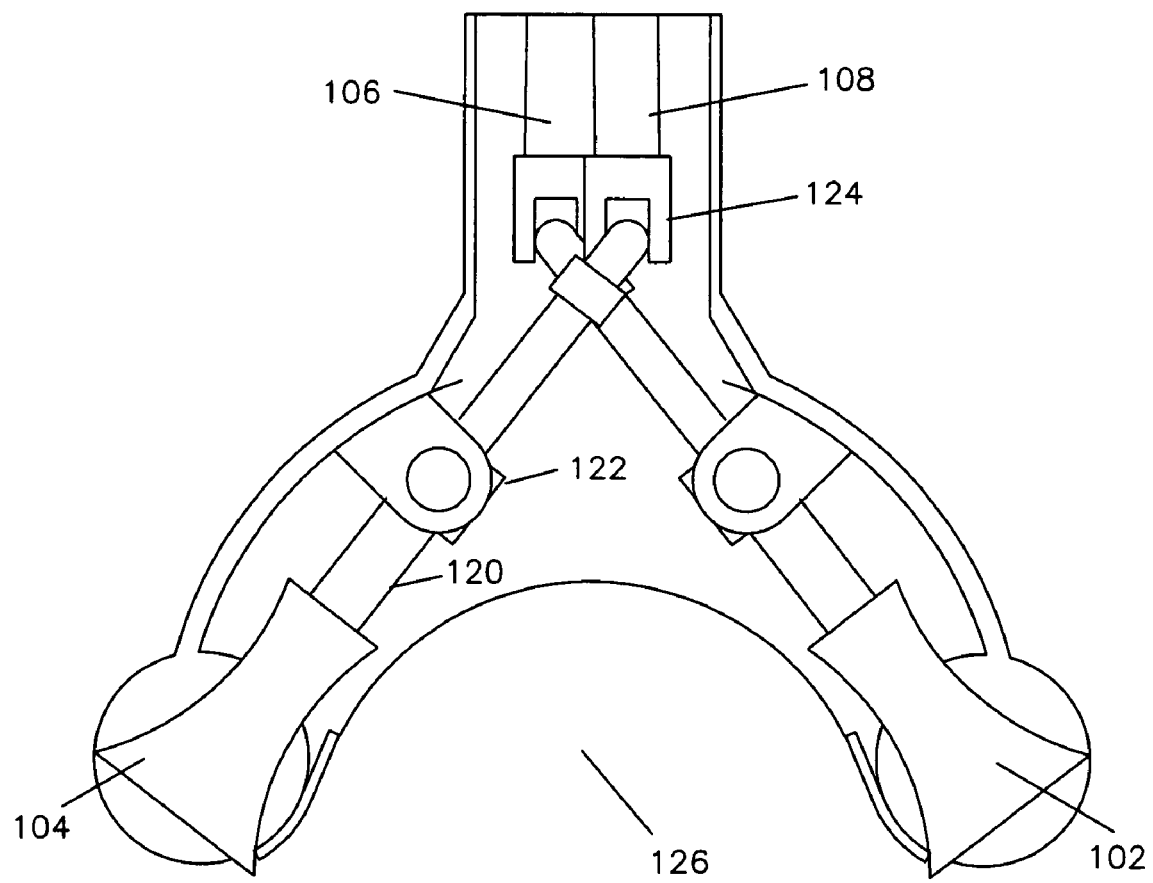
FIG. 7. shows the rollers of the alternate embodiment and their method of engaging the pipeline.

Referring now to FIG. 7, roller 104 is supported on axle120 which pivots about pivot 122 and extends to universal joint 124 and then upward by shaft 108 to motor 110 (not shown). When shaft 108 is pushed down by cylinder 114 (not shown), the roller104 pivots away from the central opening 126. When the cylinder 114 pulls up, the roller 104 is moved toward the central cavity 126 and toward subsea pipeline 10 when subsea pipeline 10 is in the central cavity 126.

Figure 8:
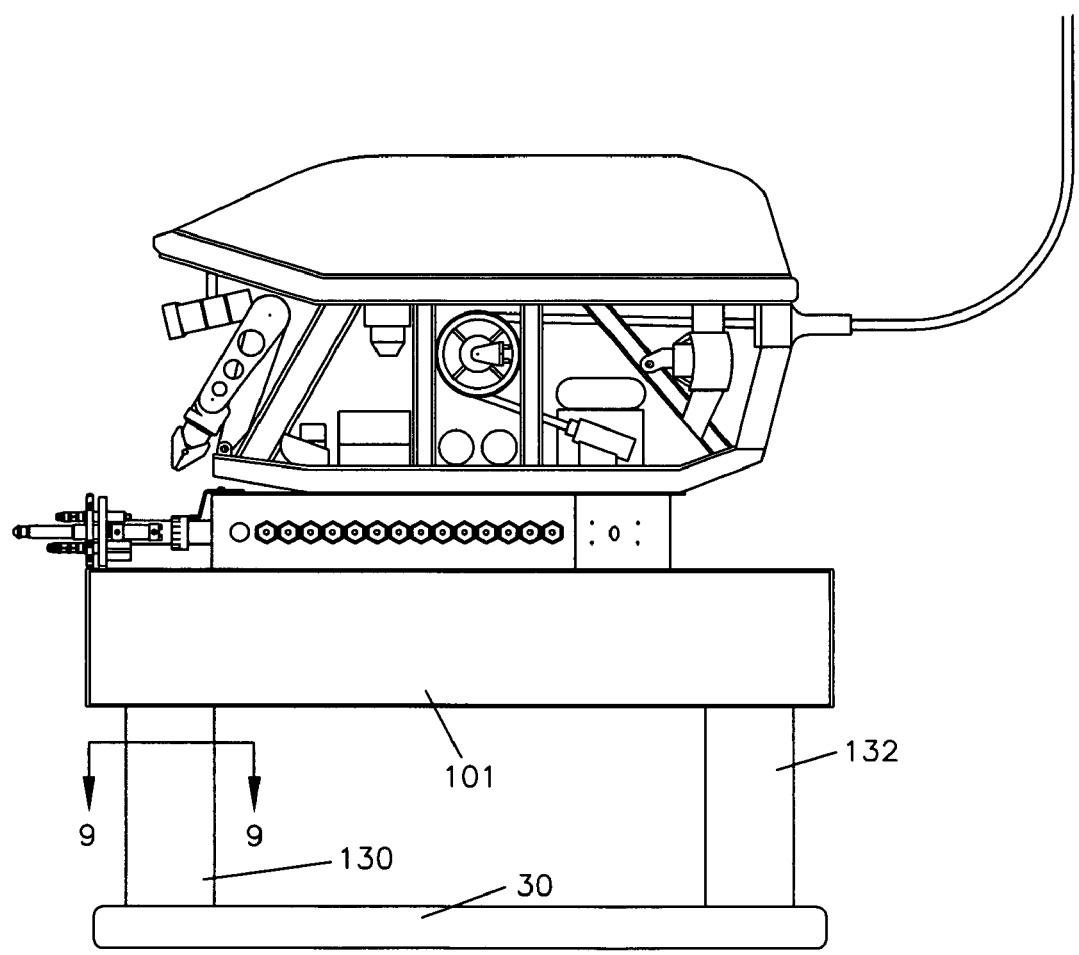
FIG. 8 shows a side view of the thermal operating module of the alternate embodiment with the circulation chamber spaced a distance away from the upper section by a pair of legs.

Referring now to FIG. 8, a side view of the alternate embodiment is shown illustrating that two stream lined legs 130 and 132 connect the circulation chamber 30 to the heat generation section 101.

Figure 9:
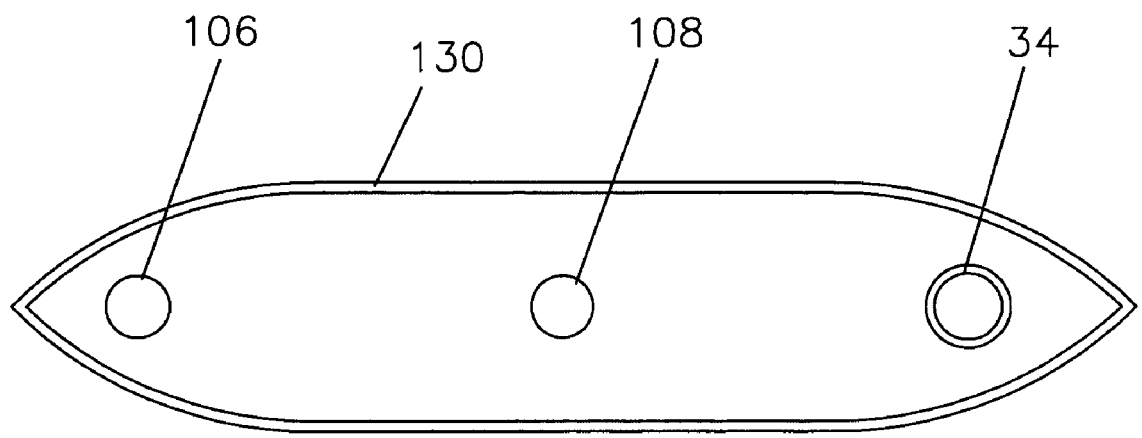
FIG. 9 is a section thru one of the legs of FIG. 8.

Referring now to FIG. 9, a cross section of leg 130 of FIG. 8 is shown illustrating the streamlined shape and the location of drive shafts 106 and 108 and the return line 34.

Figure 10:
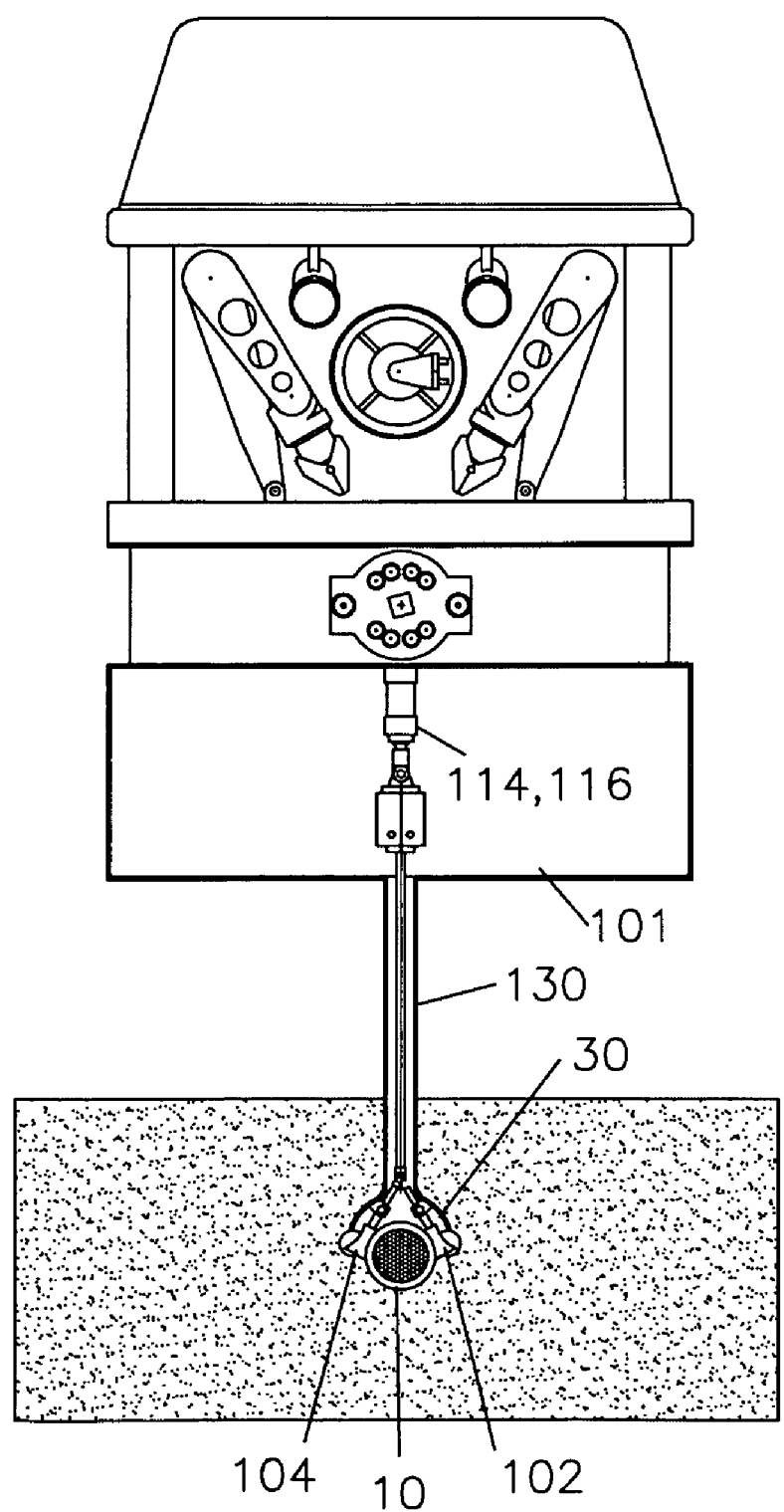
FIG. 10 is a view of the alternate embodiment engaging the subsea pipeline below the mudline.

Referring now to FIG. 10, the circulation chamber 30 along with rollers 102 and 104 are shown engaging the pipeline 10 below the seafloor. Cylinders 114 and 116 are shown retracted to the position in which the rollers 102 and 104 are engaging the pipeline 10.

Figure 11:
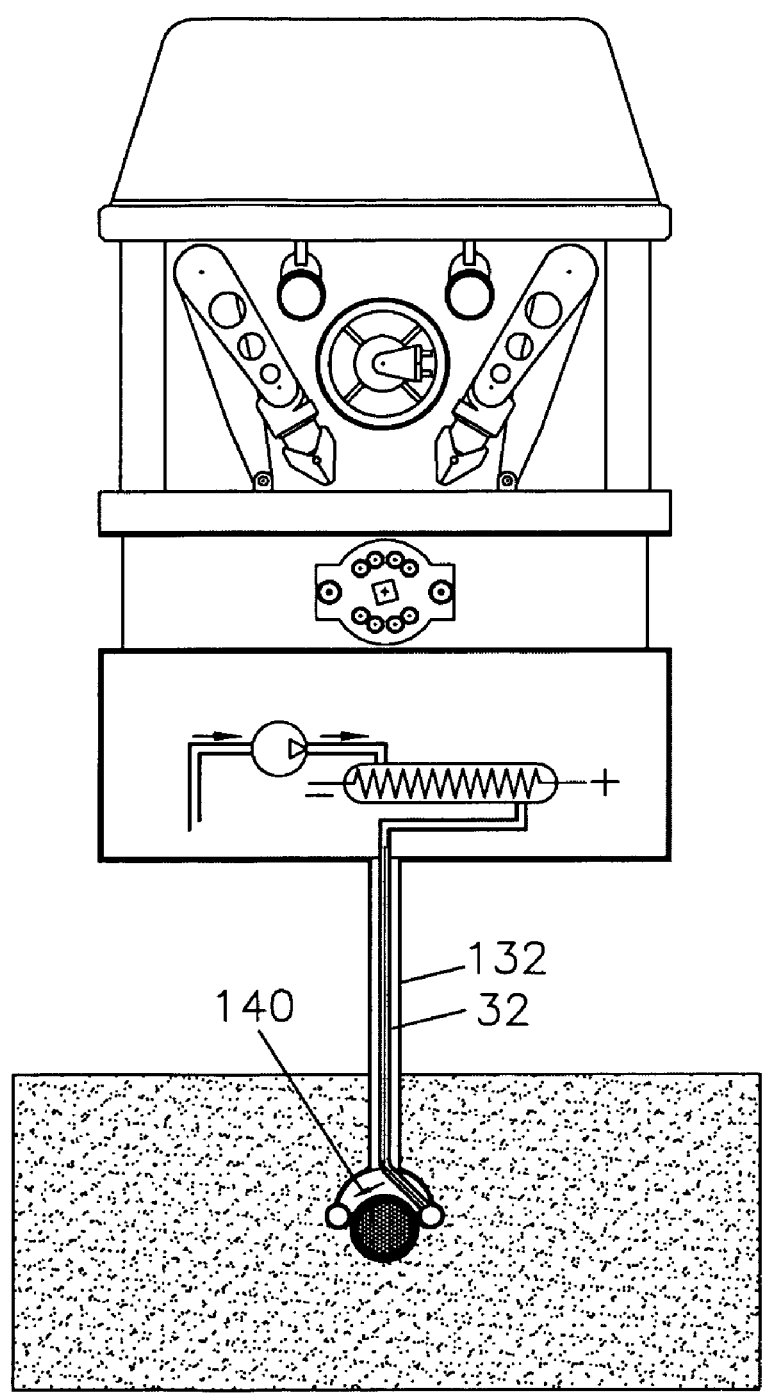
FIG. 11 is a section thru the alternate embodiment showing the heated seawater flowing down the rear leg, into an axial tube, and across the upper surface of the pipeline.

Referring now to FIG. 11, the rear leg 132 is shown with the heated seawater going down the tube 32 and across the circulation chamber 30 along arrow 140.

Figure 12:
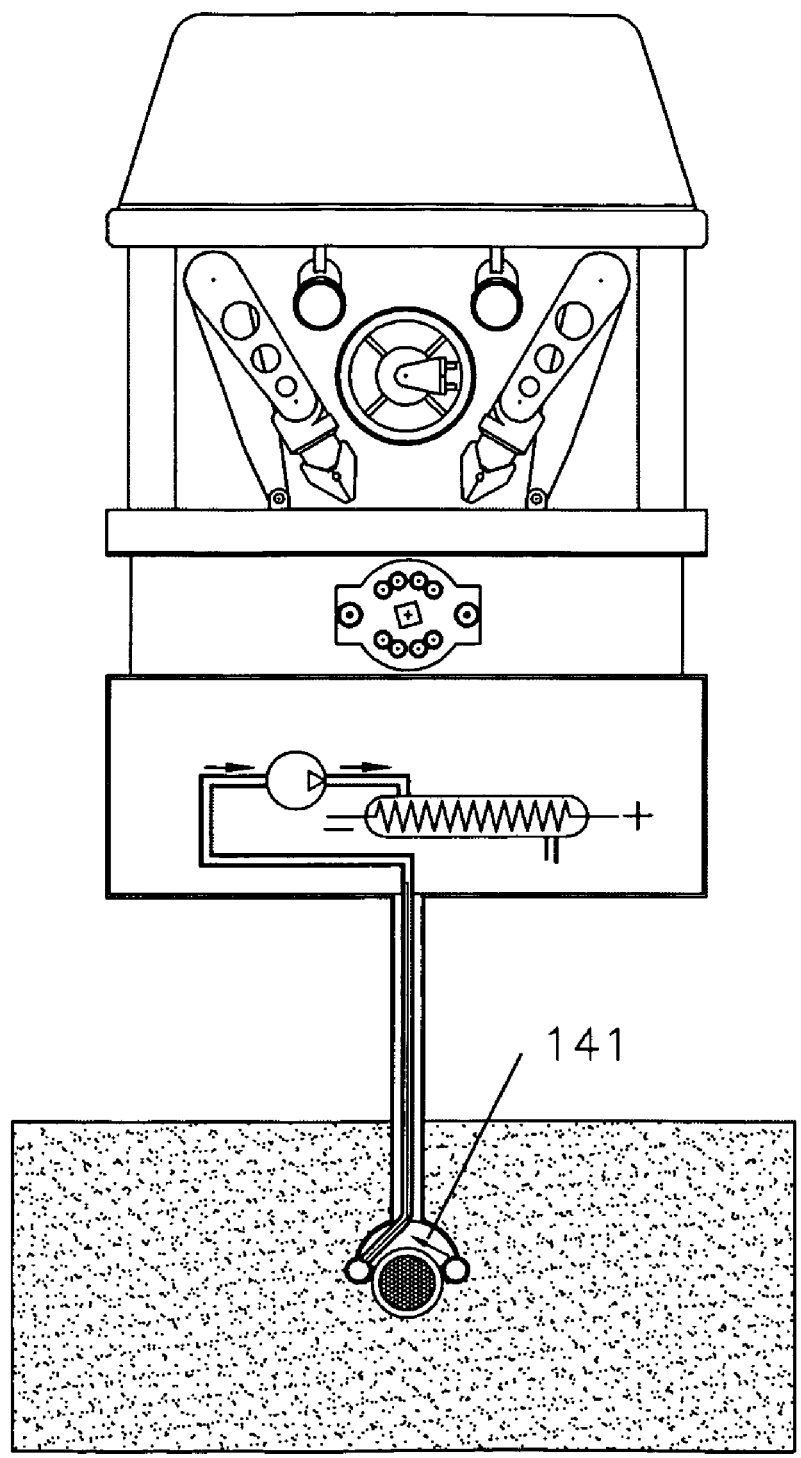
FIG. 12 is a section thru the alternate embodiment showing the heated seawater flowing across the upper surface of the pipeline, into an axial tube, and up the front leg.

Referring now to FIG. 12, the front leg 130 is shown with the somewhat cooled seawater returning back to the pump for recirculation along arrow 141.

Figure 13:
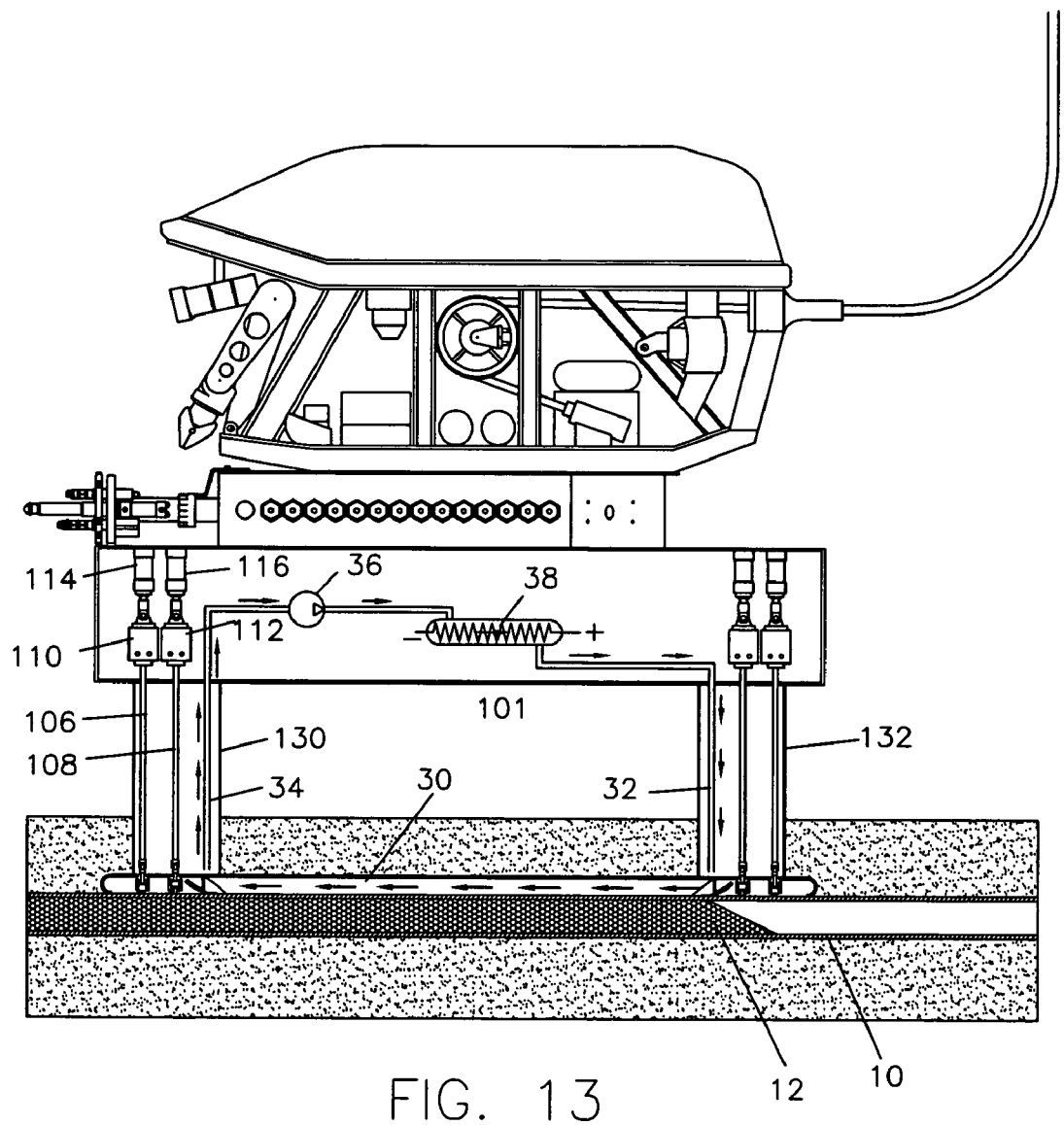
FIG. 13 is a partial section thru the alternate embodiment showing the full circulation of the heated water down the rear leg, along the circulation chamber and back up the front leg.

Referring now to FIG. 13, a partial section of the alternate embodiment is shown with the full circulation path. The components as discussed in FIG. 6 are shown within the front leg 130, and matching components are shown in the rear leg 132. Both the front leg 130 and the rear leg 132 would have similar streamlined profiles as illustrated in FIG. 9.

The foregoing disclosure and description of this invention are illustrative and explanatory thereof, and various changes in the size, shape, and materials as well as the details of the illustrated construction may be made without departing from the spirit of the invention.

What is claimed is:

1. A method of removing blockages of hydrates or paraffins from the inside of a subsea pipeline by the steps of landing a remotely operated vehicle on said subsea pipeline, engaging said subsea pipeline with traction means which are powered to control the movement of said remotely operated vehicle along said pipeline, sealingly engaging the outer surface of said subsea pipeline, flowing seawater over a portion of the outer surface of said subsea pipeline, heating the seawater which is flowing over the outer surface of said subsea pipeline to a temperature higher than the ambient temperature surrounding said subsea pipeline, and after said seawater is circulated over said portion of the outer surface of said subsea pipeline, recirculating said seawater back into circulating pumps, past the means of heating said seawater again, and over the portion of the outer surface of said pipeline again, such that said hydrates or paraffins will melt and form liquids and/or gases.

2. The method as claimed in claim 1, whereby the step of heating said seawater includes using an electrical resistance heater.

3. The method as claimed in claim 1, whereby the step of heating said seawater includes providing a differential pressure across a pressure reducing means.

4. The method as claimed in claim 1, whereby the step of heating said seawater includes mixing of chemicals which produce heat upon mixture.

5. The method as claimed in claim 1, whereby said traction means are rollers which are curved on the outer surface to partially conform the outer surface of said subsea pipeline.

6. The method as claimed in claim 1, whereby the outer surface of said subsea pipeline is engaged by resilient flappers.

7. A method of removing hydrates or paraffins from the inside of a subsea pipeline by having a remotely controlled vehicle place a circulation chamber adjacent to said pipeline said, circulation chamber having an open side to said pipeline, engaging said subsea pipeline to control the movement of said remotely controlled vehicle along said pipeline, circulating seawater alternately over a portion of the outer surface of said pipeline and over heating means to cause the hydrates or paraffins to melt into liquids and/or gases within said subsea pipeline.

8. The invention of claim 7 wherein said heating means is electric heating.

9. The invention of claim 7 wherein said heating means is a pressure reducing means.

10. The invention of claim 7 wherein said heating means is chemical.

11. The invention of claim 7 further comprising the step of moving a circulation chamber along the subsea pipeline while circulating said seawater.

12. The invention of claim 11 wherein resilient seals are provided between said circulation chamber and said subsea pipeline to separate said heated seawater within said circulation chamber from the seawater outside said circulation chamber.

13. A method of removing hydrates or paraffins from a subsea pipeline by having a remotely controlled vehicle place a circulation chamber adjacent to said pipeline, said circulation chamber having an open side to said pipeline, engaging said subsea pipeline to control the movement of said remotely controlled vehicle along said pipeline, repeatedly circulating seawater out of said circulation chamber, through heating means, back into said circulation chamber, and across a portion of said pipeline, such that heated seawater will be circulated across said portion of said pipeline to warm said pipeline and heat added to said seawater not transferred to said portion of said pipeline will increase the inlet seawater temperature to the heating means.

14. The invention of claim 13 wherein said hydrates or paraffins are melted into liquids or gases to eliminate a blockage.

15. The invention of claim 13 wherein said heating means is electric heating.

16. The invention of claim 13 wherein said heating means is a pressure reducing means.

17. The invention of claim 13 wherein said heating means is chemical.

18. The invention of claim 13 wherein a circulation chamber is moved along said subsea pipeline while circulating said heated fluid on said subsea pipeline.

19. The invention of claim 18 wherein resilient seals are provided between said circulation chamber and said pipeline to separate said heated fluid within said circulation chamber from the seawater outside said circulation chamber.

* * * * *